E. MOENCH.
VEHICLE PUSHING DEVICE.
APPLICATION FILED DEC. 27, 1915.
1,202,203.
Patented Oct. 24, 1916.
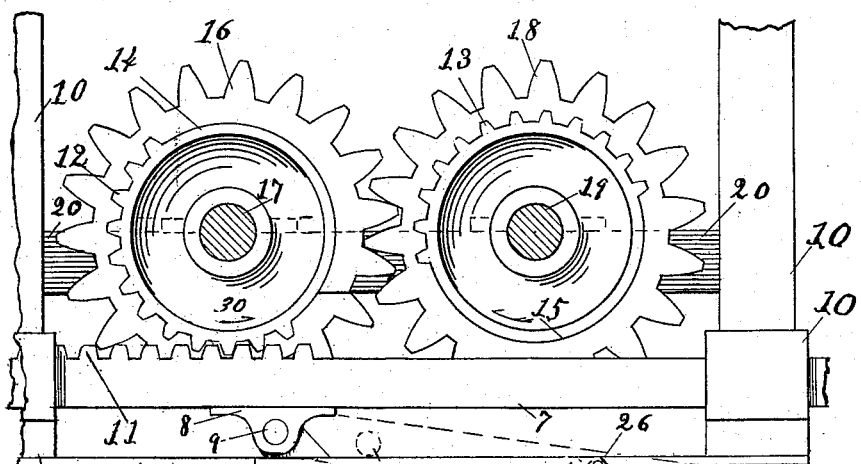
Fig. I.
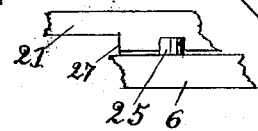
Fig. II.
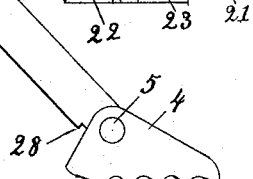
Fig. III.
Inventor
Emil Moench,
Witnesses
N. S. Waller.
D. E. Waller.
By W. X. Stevens,
Attorney

UNITED STATES PATENT OFFICE.

EMIL MOENCH, OF SEATTLE, WASHINGTON.

VEHICLE-PUSHING DEVICE.

1,202,203.   Specification of Letters Patent.   Patented Oct. 24, 1916.

Application filed December 27, 1915. Serial No. 68,677.

*To all whom it may concern:*

Be it known that I, EMIL MOENCH, a citizen of the United States, residing at Seattle, in the county of King and State of Washington, have invented certain new and useful Improvements in Vehicle-Pushing Devices, of which the following is a specification.

This invention relates to means for starting a vehicle which has become stalled by slipping of the propelling wheels on the ground or from any other cause, and its object is to provide an attachment for vehicles whereby force may be applied in the vehicle to push on the ground.

To this end, my invention consists in the construction and combination of parts forming a vehicle pushing device hereinafter more fully described and particularly stated in the claims, reference being had to the accompanying drawing in which:

Figure I, represents my invention in side view and a portion of the connections for attaching it to a vehicle. Figs. II, and III, show fragmentary plan views of the pushing brace, the shelf on which it rides forward, and the switch that raises it.

Let numeral 4 represent a foot transversely corrugated on its under side to engage the ground, and hung by a pivot pin 5 to a pushing brace 6. This brace is hung to a bar 7 by means of a hinge block 8 and a pivot pin 9. The bar 7 is mounted to reciprocate longitudinally in hangers 10 that may serve to attach the device to a vehicle, and is provided with a rack of teeth 11 which are alternately engaged by the semicircular segments of teeth 12 and 13, the remaining semicircles 14 and 15 of the respective wheels being toothless. A gear wheel 16 which is either integral with the wheel 14 or is rigidly mounted therewith on the same shaft 17, engages a similar toothed wheel 18 that is integral with the wheel 15 or is rigidly mounted therewith on the shaft 19. The shafts 17 and 19 may be mounted to revolve in bearings on suitable supports such as the crossbar 20 attached to the hangers 10. A bar 21 secured to the hangers 10, has a laterally projecting shelf 22, at the rear end of which hangs a switch 23 by means of a pivot pin 24. This switch hangs in the path of the pin 25 that projects from a side of the brace 6. Power to revolve the shaft 17 in the direction of the arrow 30 may be communicated by usual appliances adapted to the conditions required to fit this device to different vehicles. When the service of this pusher is required the operator merely connects shaft 17 with the driving power, thus causing the segment of teeth 12 to engage the rack 11 on bar 7, driving it and the pushing brace backward and the foot 4 engaging the ground pushes the vehicle forward. The pin 25 striking the switch 23 swings it up out of the way and passes beyond, permitting the switch to swing down. Then segment of teeth 13, revolving the other way, engages the rack and drives it forward, the switch guiding the pin 25 onto the shelf 22 at 26, thus lifting the foot 4 free from the ground, and as the bar 7 continues to slide forward it carries the pushing brace and its attachments as shown in prime numbers 6', 4' until the pin 25 drops off from the shelf 22 at 27. Then the segment of teeth 13 passes out of the rack and the segment 12 reëngages it. Some freedom of motion of the foot on pin 5 permits the foot to set fairly on the ground at varying slants, and the shoulder 28 on the brace holds the foot in proper position to reëngage the ground. This reciprocating motion of the pusher will continue as long as power is applied to the shaft 17. This application may be made by well known means such as sprocket wheels and chains, worm and gear wheel, hand lever pawl and ratchet, etc.

It will be readily understood that a pushing brace may be set to push backward instead of forward. By such means great pushing power may be applied in cases of emergency. The device is comparatively inexpensive.

I claim;

1. In a vehicle pushing device, a toothed rackbar mounted to reciprocate longitudinally in bearings having means for attachment to the vehicle; two gear wheels mounted to engage each other; two toothed segments of smaller wheels secured respectively to the first named wheels to revolve therewith, and the toothed segments arranged to alternately engage the said toothed rack bar, and a pushing brace pivotally hung to the rack bar to engage the ground.

2. In a vehicle pushing device, a bar mounted to be longitudinally reciprocated in bearings attachable to a vehicle; a pushing brace pivotally hung upon the bar; a transversely corrugated foot pivotally hung upon the brace, the brace having a shoulder limiting the forward swing of the foot, and means for raising the brace and foot in their forward movement.

3. In a vehicle pushing device, a bar mounted for longitudinal reciprocating movement; a pushing brace pivotally hung to the bar and a pin projecting from its side; a bar fixed longitudinally with the reciprocating bar and having a shelf projecting at one side; a switch hung in the path of the projecting pin to guide it onto the said shelf, and the shelf terminating at nearly the opposite end of the path of the pin.

In testimony whereof I affix my signature in presence of two witnesses.

EMIL MOENCH.

Witnesses:
  GEO. W. COOK,
  GUS LARSON.